United States Patent
Ang et al.

(10) Patent No.: US 10,111,003 B2
(45) Date of Patent: Oct. 23, 2018

(54) SURROUND ACOUSTIC BOX SYSTEM

(71) Applicant: Sound Cheers Limited, Tortola (VG)

(72) Inventors: Joo Suah Ang, Singapore (SG); Kheng Wee Lee, Singapore (SG); Yeh Huar Kek, Singapore (SG); Jiong Luo, Singapore (SG)

(73) Assignee: SOUND CHEERS LIMITED, Tortola (VG)

(*) Notice: Subject to any disclaimer, the term of this patent is extended or adjusted under 35 U.S.C. 154(b) by 0 days.

(21) Appl. No.: 15/411,912

(22) Filed: Jan. 20, 2017

(65) Prior Publication Data

US 2018/0176686 A1  Jun. 21, 2018

(30) Foreign Application Priority Data

Dec. 15, 2016 (TW) .............................. 105219133 U

(51) Int. Cl.
*H04R 5/02* (2006.01)
*H04R 5/04* (2006.01)
(Continued)

(52) U.S. Cl.
CPC ................. *H04R 5/02* (2013.01); *H04R 5/04* (2013.01); *G10L 19/008* (2013.01);
(Continued)

(58) Field of Classification Search
CPC .... H04R 5/04; H04R 1/023; H04R 2201/403; H04R 1/403; H04S 5/005; H04S 2400/01;
(Continued)

(56) References Cited

U.S. PATENT DOCUMENTS 8,150,460 B1 * 4/2012 Curtis ...................... H04R 5/04
379/174
9,294,840 B1 * 3/2016 Anderson ................ H04R 5/00
(Continued)

FOREIGN PATENT DOCUMENTS

DE 202012102524 U1 * 8/2012 ............... H04R 5/02

OTHER PUBLICATIONS

Philips, Philips Fidelio user Manual, 2013.*

*Primary Examiner* — Davetta W Goins
*Assistant Examiner* — Kuassi Ganmavo
(74) *Attorney, Agent, or Firm* — Chun-Ming Shih

(57) ABSTRACT

A surround acoustic box system comprises at least a first separable acoustic box, at least a separable second acoustic box and a host acoustic box body, wherein the first separable acoustic box and the second separable acoustic box respectively has a forward speaker unit and a left front speaker for providing forward channels, and the host acoustic box body is a horizontal bar-like acoustic box and further includes a console circuit module, a power supply circuit module, at least a first positioning sensor part, at least a second positioning sensor part, at least two front speakers and at least two top speakers, in which the first separable acoustic box and the second separable acoustic box can be attached to the host acoustic box body or otherwise detached from the host acoustic box body so as to achieve various surround channel effects through the controls of the console circuit module.

14 Claims, 18 Drawing Sheets

(51) Int. Cl.
    *H04R 29/00* (2006.01)
    *H04N 21/4363* (2011.01)
    *H04R 1/02* (2006.01)
    *H04S 5/00* (2006.01)
    *H04N 21/436* (2011.01)
    *H04S 5/02* (2006.01)
    *G10L 19/008* (2013.01)
    *H04R 1/40* (2006.01)

(52) U.S. Cl.
    CPC ..... *H04N 21/436* (2013.01); *H04N 21/43635* (2013.01); *H04R 1/023* (2013.01); *H04R 1/403* (2013.01); *H04R 29/002* (2013.01); *H04R 2201/403* (2013.01); *H04R 2420/07* (2013.01); *H04R 2420/09* (2013.01); *H04S 5/005* (2013.01); *H04S 5/02* (2013.01); *H04S 2400/01* (2013.01)

(58) Field of Classification Search
    CPC ....... H04S 5/02; G10L 19/008; H04N 21/436; H04N 21/43637; H04N 21/43635; H04N 21/43615

See application file for complete search history.

(56) References Cited

U.S. PATENT DOCUMENTS

| | | | |
|---|---|---|---|
| 2008/0157716 A1* | 7/2008 | Jo | H02J 7/0044 320/115 |
| 2012/0121111 A1* | 5/2012 | Sim | H02J 7/00 381/182 |
| 2014/0126753 A1* | 5/2014 | Takumai | H04S 7/305 381/303 |
| 2014/0294173 A1* | 10/2014 | Bonde | G06F 1/1632 379/428.02 |
| 2015/0296282 A1* | 10/2015 | Fujioka | H04R 1/02 381/79 |
| 2016/0286313 A1* | 9/2016 | Kofman | H04R 3/12 |

\* cited by examiner

SURROUND ACOUSTIC BOX SYSTEM

BACKGROUND OF THE INVENTION

1. Field of the Invention

The present invention generally relates to a surround acoustic box system; in particular, it relates to a surround acoustic box system enabling speaker detachments in order to achieve desired surround channel effects.

2. Description of Related Art

As the world advances in every aspects, acoustic equipments have now become a sort of entertainment tools comprehensively applied in human daily lives. Also, in recent years, thanks to significant progresses and breakthrough in computer technologies, computers and acoustic apparatuses can be far better combined than before, thus allowing computer users to improvise various applications in conjunction with such acoustic devices, accordingly further facilitating the popularity thereof.

In order to completely express a variety of sounds through the acoustic apparatuses, the acoustic host can be enabled to output several channels and a corresponding number of speakers can be configured such that a speaker deals with the output of a specific channel. Hence so-called "surround acoustic equipments" featuring 4 channels, 5 channels, 5.1 channels and 7.1 channels etc. have been developed and come out. With more speakers, greater number of original channels can be presented.

Lately, people further proposed certain designs and technologies concerning single-unit surround acoustic apparatuses, which essentially focuses on using the sound bouncing back from the wall to let the outputted sounds achieve the effects provided by the conventional multi-pieced surround acoustic apparatuses; however, due to differences in terms of application environments, the efficiency of such a sound bouncing approach may vary; on the other hand, integrating all of the speakers into a single entity may not allow the user to autonomously construct the intended speaker combination and desired sound field effects.

Therefore, it would be an optimal solution if it is possible to use at least two separable acoustic boxes and a host acoustic box body so that such two separable acoustic boxes can be attached or detached from the host acoustic box body thereby applying various controls via the host acoustic box body so as to achieve different surround channel effects.

SUMMARY OF THE INVENTION

In the present invention, the user can wirelessly transfer audio signals to the first separable acoustic box and the second separable acoustic box so as to achieve the effect of surround sound field, and the first separable acoustic box and the second separable acoustic box are also possible to operate independently by means of chargeable batteries respectively installed therein, thus making the present invention unique in comparison with other conventional surround sound field systems seeing that conventional surround sound field systems are usually restricted by their connection line lengths or locations of power sockets.

A surround acoustic box system, comprising: at least a first separable acoustic box, including at least a first positioning connection part, a first charging connection part and a wireless transmission circuit module, wherein it is possible to input electric power for the operations of the first separable acoustic box by way of the first charging connection part, and the first separable acoustic box comprises at least a forward speaker unit for providing the forward channel, and the forward speaker unit is installed on the forward surface of the first separable acoustic box; at least a second separable acoustic box, including at least a second positioning connection part, a second charging connection part and a wireless transmission circuit module, wherein it is possible to input electric power for the operations of the second separable acoustic box by way of the second charging connection part, and the second separable acoustic box comprises at least a forward speaker unit for providing the forward channel, and the forward speaker unit is installed on the forward surface of the second separable acoustic box; a host acoustic box body, being a horizontal bar-like acoustic box and comprising: a console circuit module, for controlling the operations of the host acoustic box body, in which the console circuit module can perform wireless signal transmissions with the first separable acoustic box and the second separable acoustic box; a power supply circuit module, electrically connected to the console circuit module thereby providing electric power the host acoustic box body require for operations; at least a first positioning sensor part, electrically connected to the console circuit module and the power supply circuit module, in which the first positioning connection part of the first separable acoustic box is connected to the first positioning sensor part thereby allowing mutual signal transmissions between the console circuit module and the first separable acoustic box; at least a second positioning sensor part, electrically connected to the console circuit module and the power supply circuit module, in which the second positioning connection part of the second separable acoustic box is connected to the second positioning sensor part thereby allowing mutual signal transmissions between the console circuit module and the second separable acoustic box; a front speaker set, installed on the forward surface of the host acoustic box body, in which the front speakers are electrically connected to the console circuit module and the power supply circuit module thereby outputting to provide the right channel effect, left channel effect and central straight channel effect; a top speaker set, obliquely installed on the upward surface of the host acoustic box body, in which the top speakers are electrically connected to the console circuit module and the power supply circuit module thereby outputting to provide the upper right channel effect and upper left channel effect; and wherein the first separable acoustic box and the second separable acoustic box can be attached to the host acoustic box body or detached therefrom so as to achieve various surround channel effects through the controls of the console circuit module.

In a preferred embodiment, the first charging connection part can be a contact endpoint, and the host acoustic box body further includes a first power supply output part electrically connected to the console circuit module and the power supply circuit module, in which the first charging connection part can be electrically connected to the first power supply output part such that the first power supply output part can output electric power to the first charging connection part of the first separable acoustic box.

In a preferred embodiment, the first charging connection part is a USB port, and a power line having a USB plug can be connected thereto.

In a preferred embodiment, the second charging connection part can be a contact endpoint, and the host acoustic box body further includes a second power supply output part electrically connected to the console circuit module and the power supply circuit module, in which the second charging connection part can be electrically connected to the second power supply output part such that the second power supply output part can output electric power to the second charging connection part of the second separable acoustic box.

In a preferred embodiment, the second charging connection part is a USB port, and a power line having a USB plug can be connected thereto.

In a preferred embodiment, the first separable acoustic box further includes at least an upward speaker unit for providing upward channels, and the upward speaker unit is obliquely installed on the upward surface of the first separable acoustic box.

In a preferred embodiment, the second separable acoustic box further includes at least an upward speaker unit for providing upward channels, and the upward speaker unit is obliquely installed on the upward surface of the second separable acoustic box.

In a preferred embodiment, the surround acoustic box system further comprises a bass speaker acoustic box enabling wireless signal transmissions with the console circuit module thereby providing bass effect outputs.

In a preferred embodiment, the console circuit module can control any one or more of the first separable acoustic box, the second separable acoustic box and the console acoustic box body to output bass effects.

In a preferred embodiment, the first separable acoustic box further includes a first positioning frame bar capable of at least encompassing the first positioning connection part, and the host acoustic box body further includes a first positioning frame hole corresponding to the first positioning frame bar, and the first positioning frame hole can at least encompass the first positioning sensor part, in which the first positioning frame bar can be inserted into the first positioning frame hole such that the first positioning connection part precisely aligns with the first positioning sensor part.

In a preferred embodiment, the first separable acoustic box further includes a first frame and the host acoustic box body further includes a first groove corresponding to the first frame, in which, after inserting the first frame into the first groove, the first positioning connection part can be precisely connected to the first positioning sensor part.

In a preferred embodiment, the second separable acoustic box further includes a second positioning frame bar capable of at least encompassing the second positioning connection part, and the host acoustic box body further includes a second positioning frame hole corresponding to the second positioning frame bar, and the second positioning frame hole can at least encompass the second positioning sensor part, in which the second positioning frame bar can be inserted into the second positioning frame hole such that the second positioning connection part precisely aligns with the second positioning sensor part.

In a preferred embodiment, the second separable acoustic box further includes a second frame and the host acoustic box body further includes a second groove corresponding to the second frame, in which, after inserting the second frame into the second groove, the second positioning connection part can be precisely connected to the second positioning sensor part.

In a preferred embodiment, the inside of the first separable acoustic box further includes a first chargeable battery electrically connected to the first charging connection part.

In a preferred embodiment, the inside of the second separable acoustic box further includes a second chargeable battery electrically connected to the second charging connection part.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Refer first to FIGS. 1A-1D and 2A, wherein an overall architecture diagram, an architecture diagram for the first separable acoustic box, an architecture diagram for the second separable acoustic box, an architecture diagram for the host acoustic box body of the surround acoustic box system and overall structure diagram for the surround acoustic box system according to the present invention are respectively shown, and the illustrated surround acoustic box system comprises at least a first separable acoustic box 1, at least a second separable acoustic box 2, a host acoustic box body 3 and a bass speaker acoustic box 4.

Figure 1A:
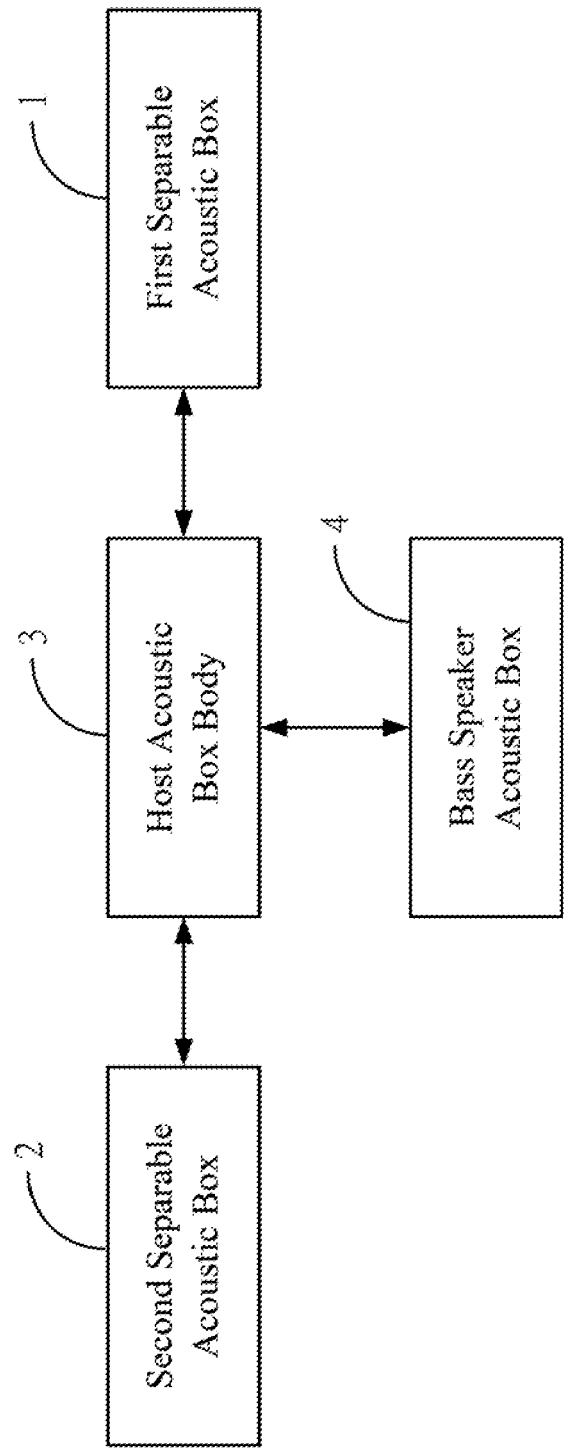
FIG. 1A shows an overall architecture diagram for the surround acoustic box system according to the present invention.
Figure 1B:
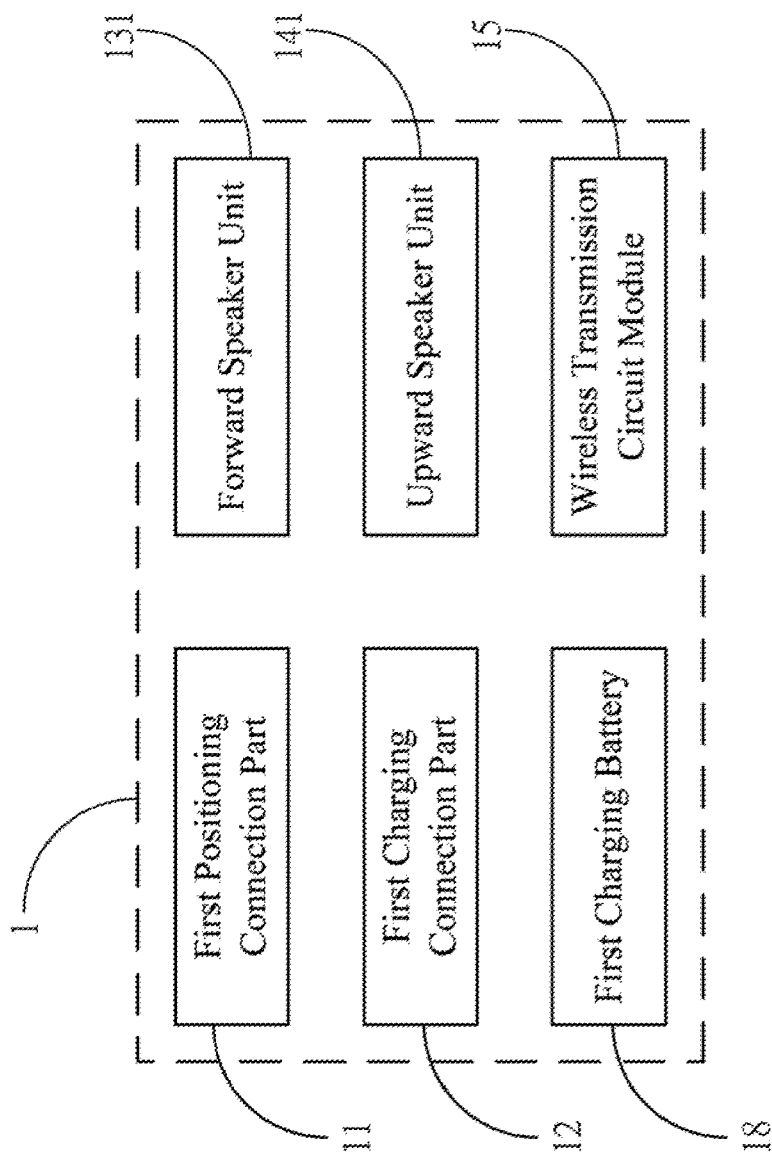
FIG. 1B shows an architecture diagram for the first separable acoustic box in the surround acoustic box system according to the present invention.

As shown in FIG. 1B, the first separable acoustic box 1 includes at least a first positioning connection part 11, at least a first charging connection part 12 and a wireless transmission circuit module 15, in which it is possible to input the electric power required by the first separable acoustic box 1 via the first charging connection part 12, and on the forward surface 13 of the first separable acoustic box 1 there installs at least a forward speaker unit 131 for providing forward channels, and also on the upward surface 14 of the first separable acoustic box 1 there further obliquely installs at least an upward speaker unit 141 for providing upward channels; moreover, the wireless transmission circuit module 15 can be utilized to receive and transfer wireless signals.

Figure 1C:
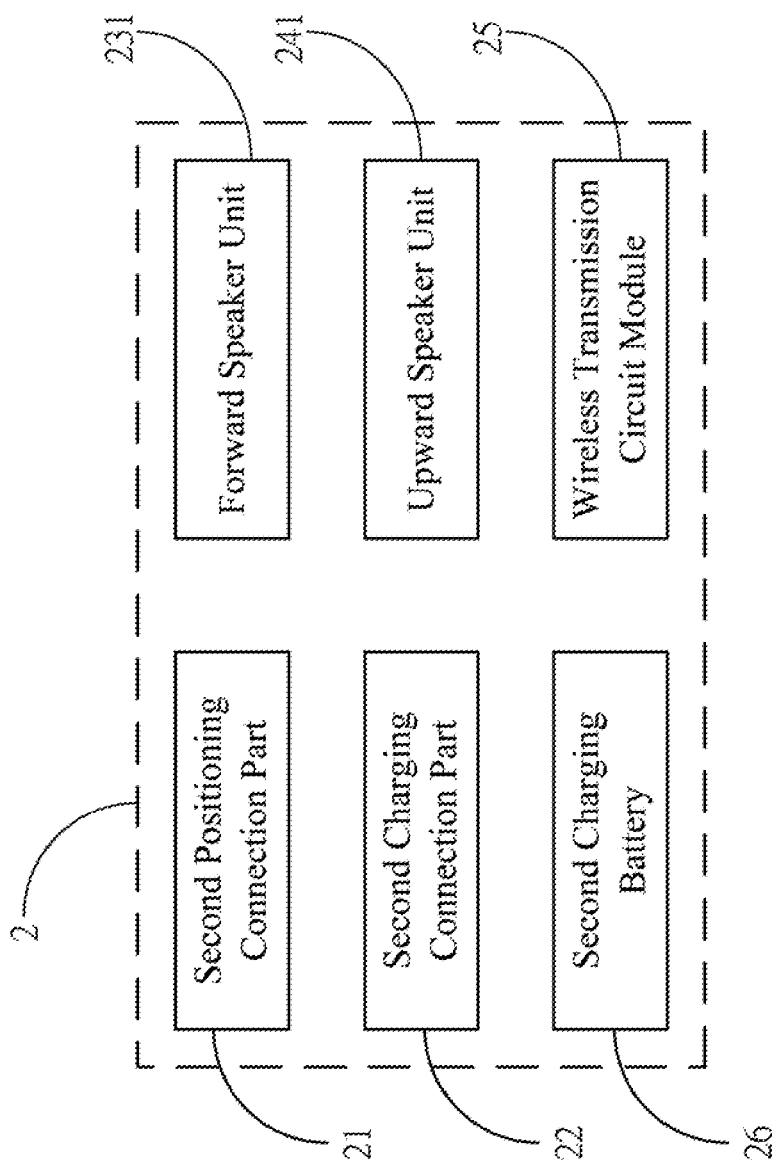
FIG. 1C shows an architecture diagram for the second separable acoustic box in the surround acoustic box system according to the present invention.

Similarly, as shown in FIG. 1C, the second separable acoustic box 2 includes at least a second positioning connection part 21, at least a second charging connection part 22 and a wireless transmission circuit module 25, in which it is possible to input the electric power required by the second separable acoustic box 2 via the second charging connection part 22, and on the forward surface 23 of the second separable acoustic box 2 there installs at least a forward speaker unit 231 for providing forward channels, and also on the upward surface 24 of the second separable acoustic box 2 there further obliquely installs at least an upward speaker unit 241 for providing upward channels; moreover, the wireless transmission circuit module 25 can be utilized to receive and transfer wireless signals.

Figure 1D:
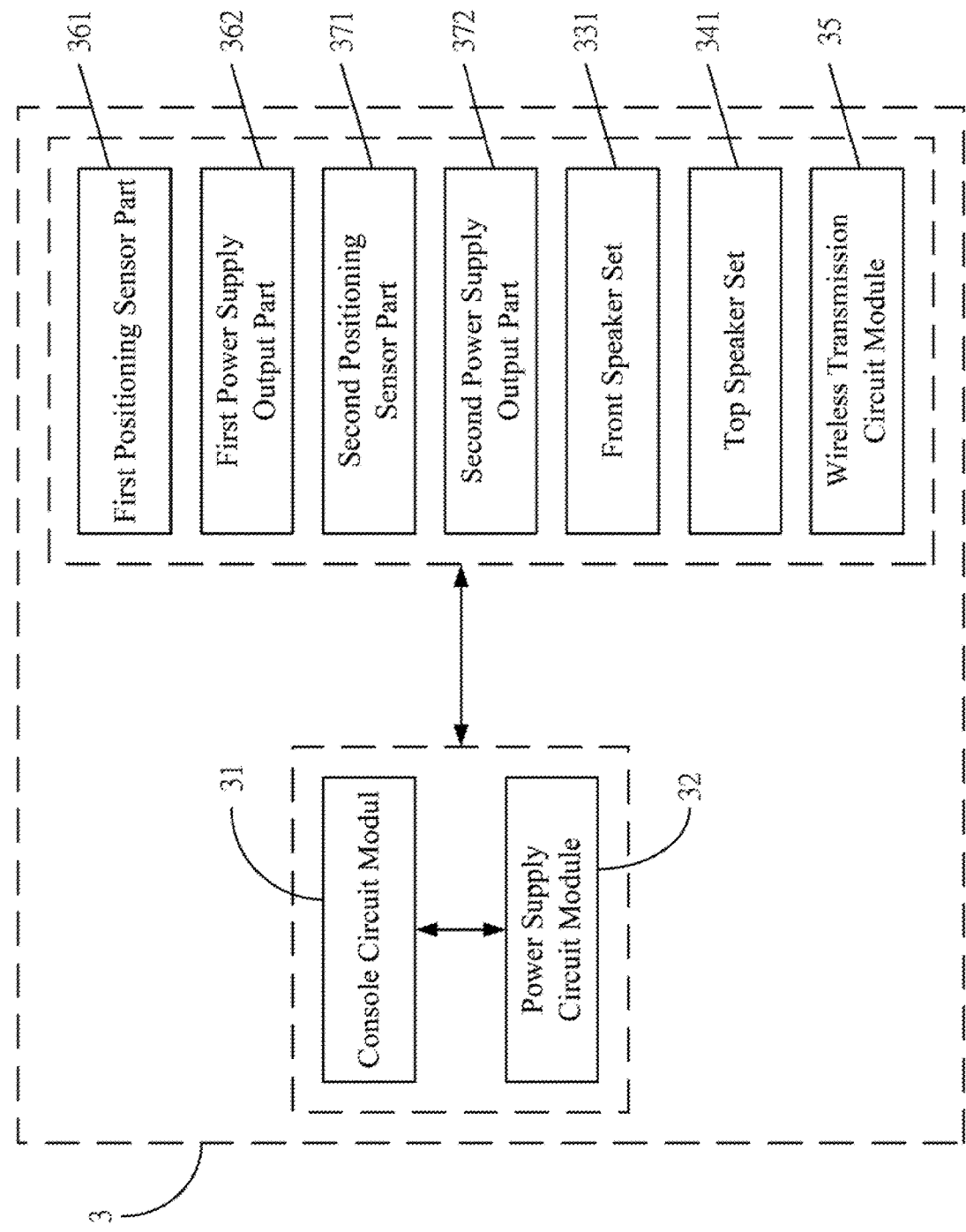
FIG. 1D shows an architecture diagram for the host acoustic box body in the surround acoustic box system according to the present invention.

Furthermore, as shown in FIG. 1D, herein the host acoustic box body 3 is a bar-like acoustic box and comprises a console circuit module 31, a power supply circuit module 32, a front speaker set 331 installed on the forward surface 33, a top speaker set 341 obliquely installed on the upward surface 34, a wireless transmission circuit module 35, at least a first positioning sensor part 361, at least a first power supply output part 362, at least a second positioning sensor part 371 and at least a second power supply output part 372.

Herein the console circuit module 31 controls the operations of the host acoustic box body 3 and is able to perform wireless signal transmissions with the wireless transmission circuit module 15 in the first separable acoustic box 1 as well as the wireless transmission circuit module 25 in the second separable acoustic box 2 by way of the wireless transmission circuit module 35, and the power supply circuit module 32 is electrically connected to the console circuit module 31 thereby providing electric power required by the host acoustic box body 3.

In order to facilitate the attachment of the first separable acoustic box 1 and the second separable acoustic box 2 to the host acoustic box body 3, a combination baseboard 36, 37 can respectively extend from each of the two sides on the host acoustic box body 3, in which the first separable acoustic box 1 can be adjoined onto the combination baseboard 36 while the second separable acoustic box 2 adjoined onto the combination baseboard 37, respectively.

Moreover, the first positioning sensor part 361 is installed on the combination baseboard 36 and electrically connected to the console circuit module 31 and the power supply circuit module 32, in which the first positioning connection part 11 in the first separable acoustic box 1 is connected to the first positioning connection part 361 such that the console circuit module 31 can verify and confirm the attachment of the first separable acoustic box 1 onto the host acoustic box body 3.

Analogously, the second positioning sensor part 371 is installed on the combination baseboard 37 and electrically connected to the console circuit module 31 and the power supply circuit module 32, in which the second positioning connection part 21 in the second separable acoustic box 2 is connected to the second positioning connection part 371 such that the console circuit module 31 can verify and confirm the attachment of the second separable acoustic box 2 onto the host acoustic box body 3.

Figure 2A:
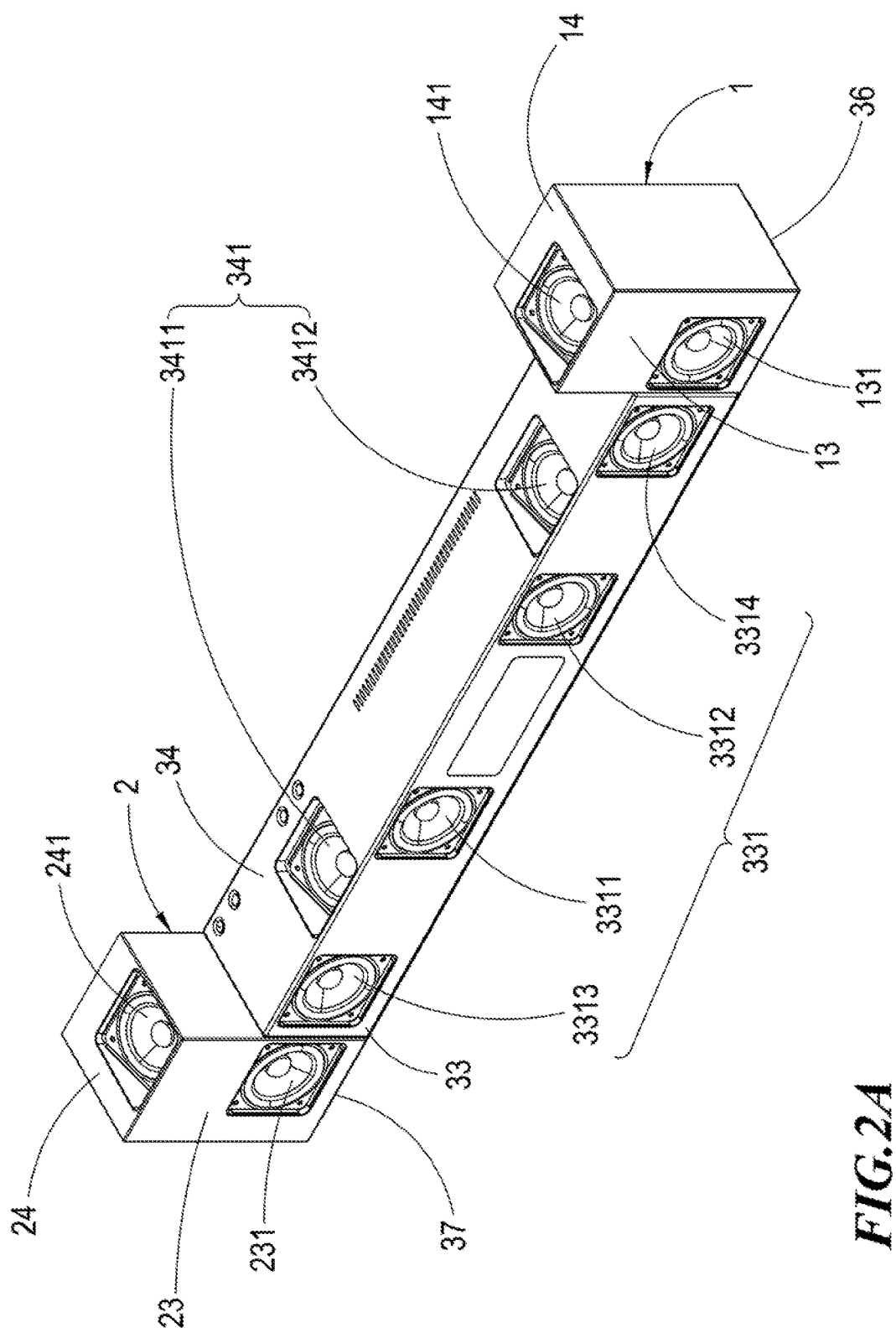
FIG. 2A shows an overall structure diagram for the surround acoustic box system according to the present invention.
Figure 2B:
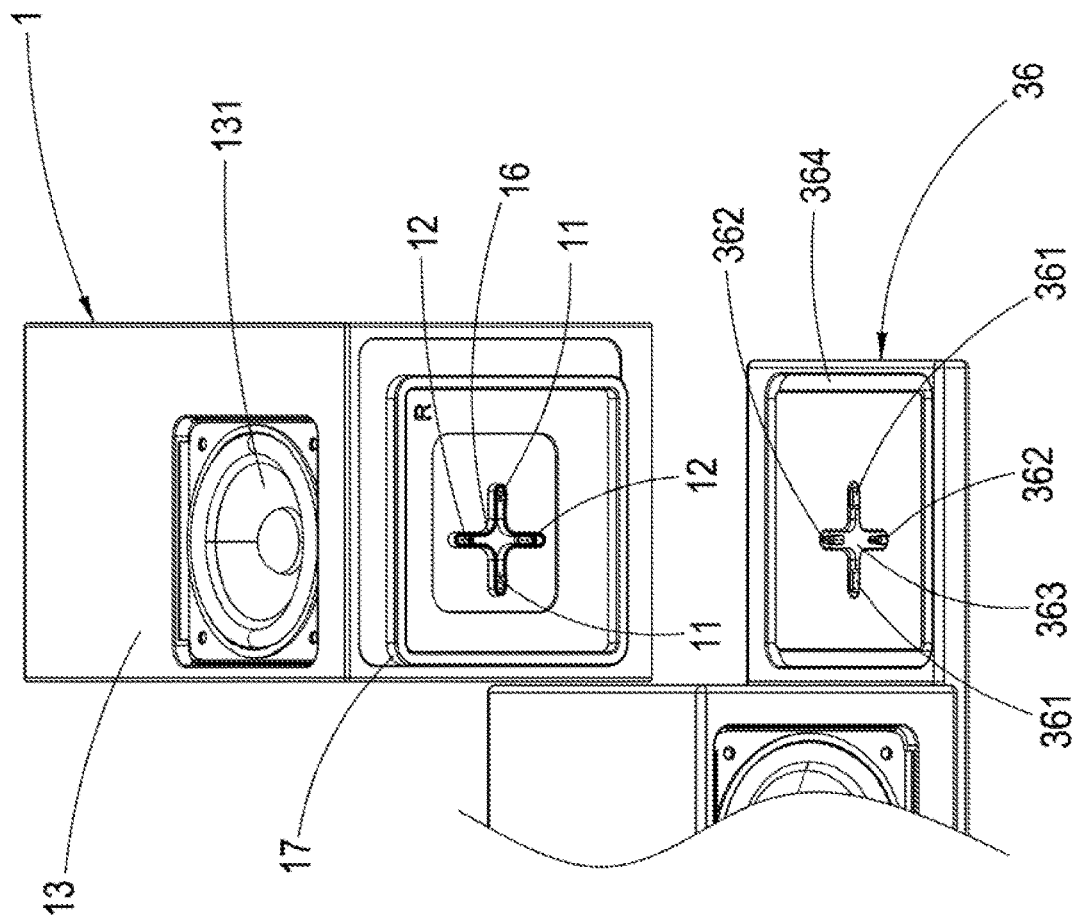
FIG. 2B shows a combined structure diagram for the separable acoustic boxes and the host acoustic box body in the surround acoustic box system according to the present invention.
Figure 2C:
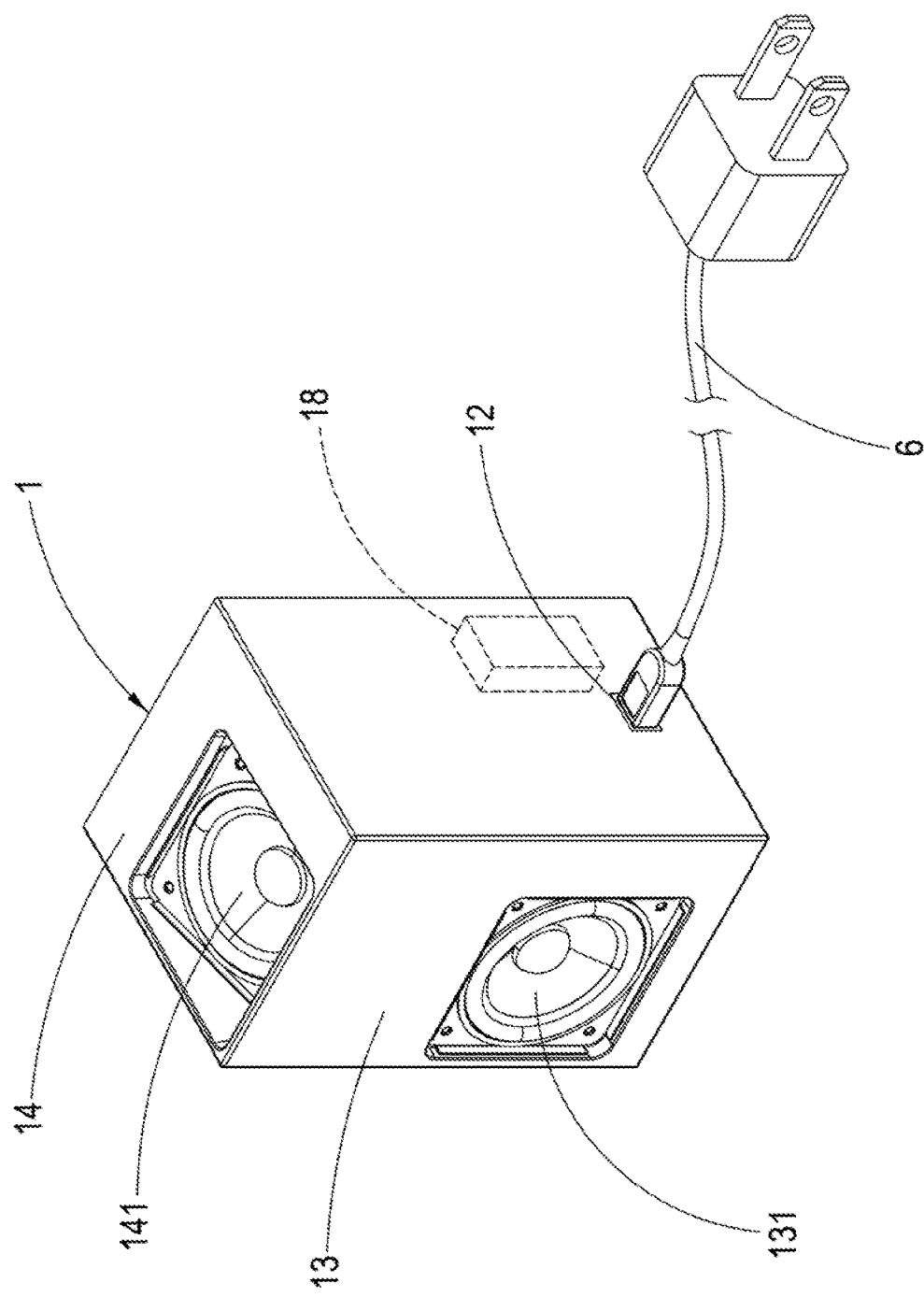
FIG. 2C shows another charging implementation diagram for the separable acoustic boxes in the surround acoustic box system according to the present invention.

Besides, the first charging connection part 12 may be a contact endpoint or a USB port; in case it is a contact endpoint, as shown in FIG. 2B, since the first power supply output part 362 is installed on the combination baseboard 36, after adjoining the first separable acoustic box 1 onto the combination baseboard 36, the first power supply output part 362 can output electric power to the first charging connection part 12 in the first separable acoustic box 1; on the other hand, if the first charging connection part 12 is a USB port, then the first power supply output part 362 needs not to be installed on the combination baseboard 36, but contrarily, as shown in FIG. 2C, it is possible to directly connect the first charging connection part 12 of the USB port to a power line 6 having a USB plug for supplying electric power.

In order to achieve the precise engagement between the first charging connection part 12 and the first power supply output part 362, the bottom of the first separable acoustic box 1 is further installed with a first positioning frame bar 16 capable of encompassing the first positioning connection part 11 (if the first charging connection 12 is a contact endpoint, the first positioning frame bar 16 can also encompass the first charging connection part 12), and the host acoustic box body 3 further includes a first positioning frame hole 363 corresponding to the first positioning frame bar 16, and the first positioning frame hole 363 can at least encompass the first positioning sensor part 361, in which the first positioning frame bar 16 can be inserted into the first positioning frame hole 363 such that the first positioning connection part 11 can then be precisely connected to the first positioning sensor part 361 (in case that the first charging connection part 12 is a contact endpoint, the first positioning frame bar 16 can also make the first charging connection part 12 electrically connect to the first power supply output part 362 precisely.)

In addition to the aforementioned structure, the first separable acoustic box 1 further includes a first frame 17 and the host acoustic box body 3 further has a first groove 364 corresponding to the first frame 14, in which, after inserting the first frame 17 into the first groove 364, the first positioning connection part 11 can be precisely connected to the first positioning sensor part 361 (suppose the first charging connection part 12 is a contact endpoint, the first frame 17 can also let the first charging connection part 12 electrically connect to the first power supply output part 362 precisely.)

Herein the first positioning frame bar 16 may be installed in a tilted fashion (e.g., on the slant towards left side) and the first positioning frame hole 363 may be located correspondingly to the first positioning frame bar 16 (e.g., also on the slant towards left side), while the installation position of the second separable acoustic box 2 encompassing the second positioning frame hole of the second positioning sensor part 371 may be otherwise oblique to the other side (e.g., towards right side), thus preventing potential installation errors such as erroneously inserting the second separable acoustic box 2 configured on the left side into the first positioning frame hole 363.

It should be noticed that the second charging connection part 22 may be also a contact endpoint or a USB port, and since the structure thereof is the same as the first charging connection part 12, its figure and illustrations are herein omitted for brevity; moreover, the combination structure formed by the second separable acoustic box 2 and the combination baseboard 37 is identical to the one formed by the first separable acoustic box 1 and the combination baseboard 36, so its figure and illustrations are herein omitted accordingly for brevity as well.

Additionally, as shown in FIG. 1B, the inside of the first separable acoustic box 1 further includes a first charging battery 18 electrically connected to the first charging connection part 12 (herein the first charging battery 18 may be a lithium battery or other types of charging batteries), so it is possible to charge the first charging battery 18 by way of the first charging connection part 12; in case the first separable acoustic box 1 is separated from the host acoustic box body 3, the first charging connection part 12 can provide electric power required by the first separable acoustic box 1 by means of the first charging battery 18 without charging power. Similarly, as shown in FIG. 1C, the inside of the second separable acoustic box 2 further includes a second charging battery 26 electrically connected to the second charging connection part 22, so it is possible to charge the second charging battery 26 by way of the second charging connection part 22; hence, in case the second separable acoustic box 2 is separated from the host acoustic box body 3, the second charging connection part 22 can provide electric power required by the second separable acoustic box 2 by means of the second charging battery 26 without charging power.

The front speaker set 331 includes four front speaker units 3311, 3312, 3313 and 3314 (or two front speaker units 3313 and 3314), and such front speaker units 3311, 3312, 3313 and 3314 are respectively and electrically connected to the console circuit module 31 and the power supply circuit module 32 thereby outputting to provide the right channel effects, left channel effects and central straight channel effects.

At the same time, the top speaker set 341 includes at least two top speaker units 3411 and 3412, and such top speaker units 3411 and 3412 are respectively and electrically connected to the console circuit module 31 and the power supply circuit module 32 thereby outputting to provide the upper right channel effects and upper left channel effects.

Figure 3:
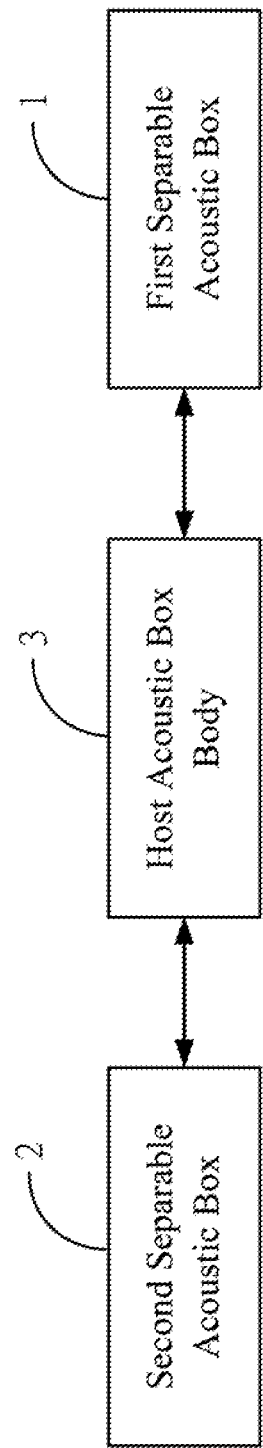
FIG. 3 shows another overall architecture diagram for the surround acoustic box system according to the present invention.

The optional bass speaker acoustic box 4 can execute wireless signal transmissions with the console circuit module 31 to provide bass sound effect outputs; however, seeing that the bass speaker acoustic box 4 may be absent, as shown in FIG. 3, the console circuit module 31 can also control any one or more of the first separable acoustic box 1, the second separable acoustic box 2 and the host acoustic box body 3 to respectively output bass sound effects.

Figure 4A:
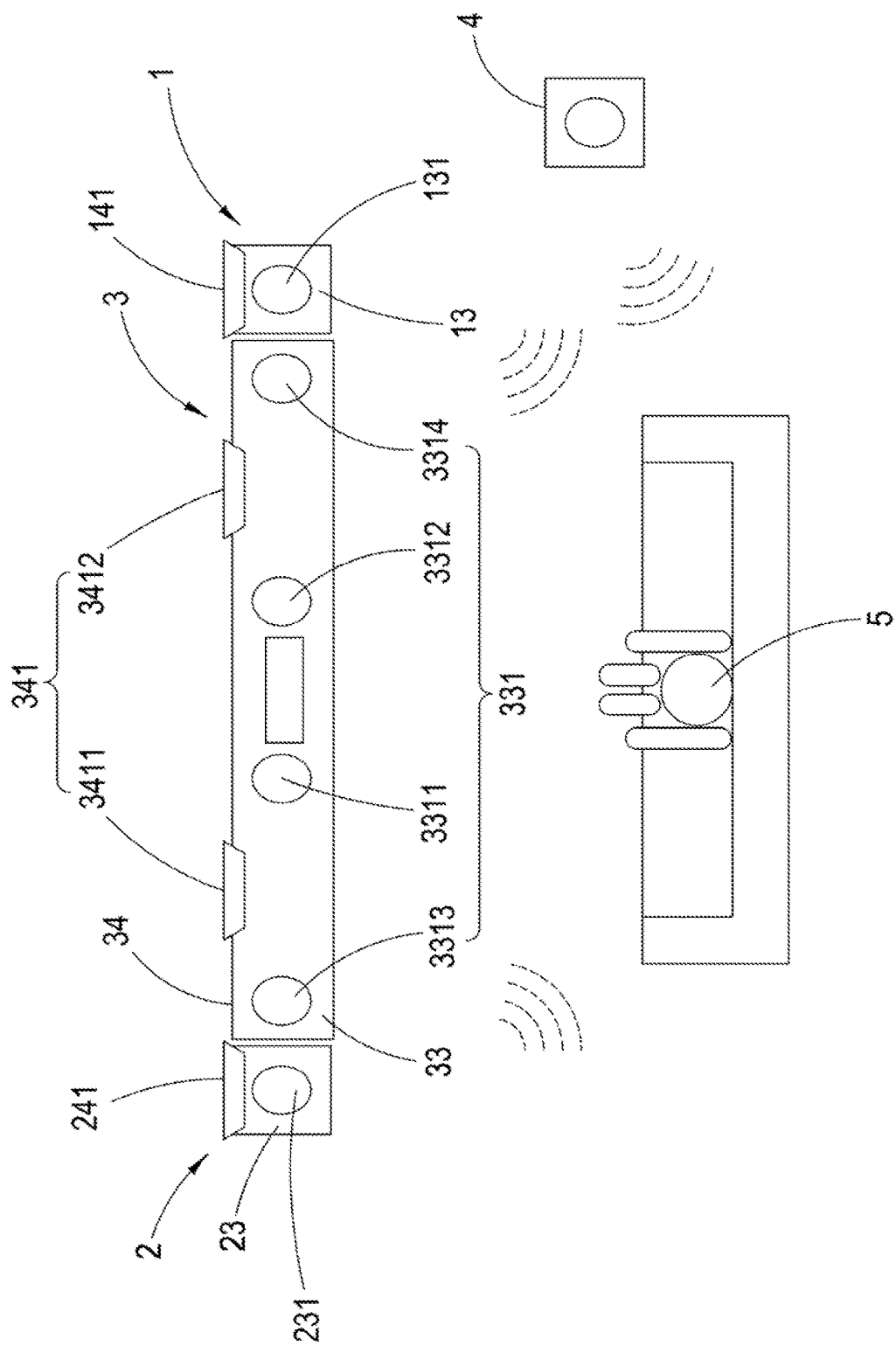
FIG. 4A shows an application diagram for a first embodiment of the surround acoustic box system according to the present invention.

With regards to a first embodiment for the application of the present invention, as shown in FIG. 4A, the first separable acoustic box 1 and the second separable acoustic box 2 are respectively adjoined onto the combination baseboards 36, 37, and the console circuit module 31 controls the first separable acoustic box 1 (including the forward speaker unit 131 and the upward speaker unit 141), the second separable acoustic box 2 (including the forward speaker unit 231 and the upward speaker unit 241), the host acoustic box body 3 (including the front speaker units 3311, 3312, 3313 and 3314 as well as top speaker units 3411 and 3412) and the bass speaker acoustic box 4 thereby constructing a "3.1.2 surround acoustic effect" for the user 5, in which the acoustic effects heard in different directions are provided as below:

(1) the front central acoustic effect is provided by the front speaker unit 3311, 3312;

(2) the front right acoustic effect is provided by the front speaker unit 3314 and the forward speaker unit 131;

(3) the front left acoustic effect is provided by the front speaker unit 3313 and the forward speaker unit 231;

(4) the upper right acoustic effect is provided by the top speaker unit 3412 and the upward speaker unit 141;

(5) the upper left acoustic effect is provided by the top speaker unit 3411 and the upward speaker unit 241; and (6) the bass acoustic effect is provided by the bass speaker acoustic box 4.

Figure 4B:
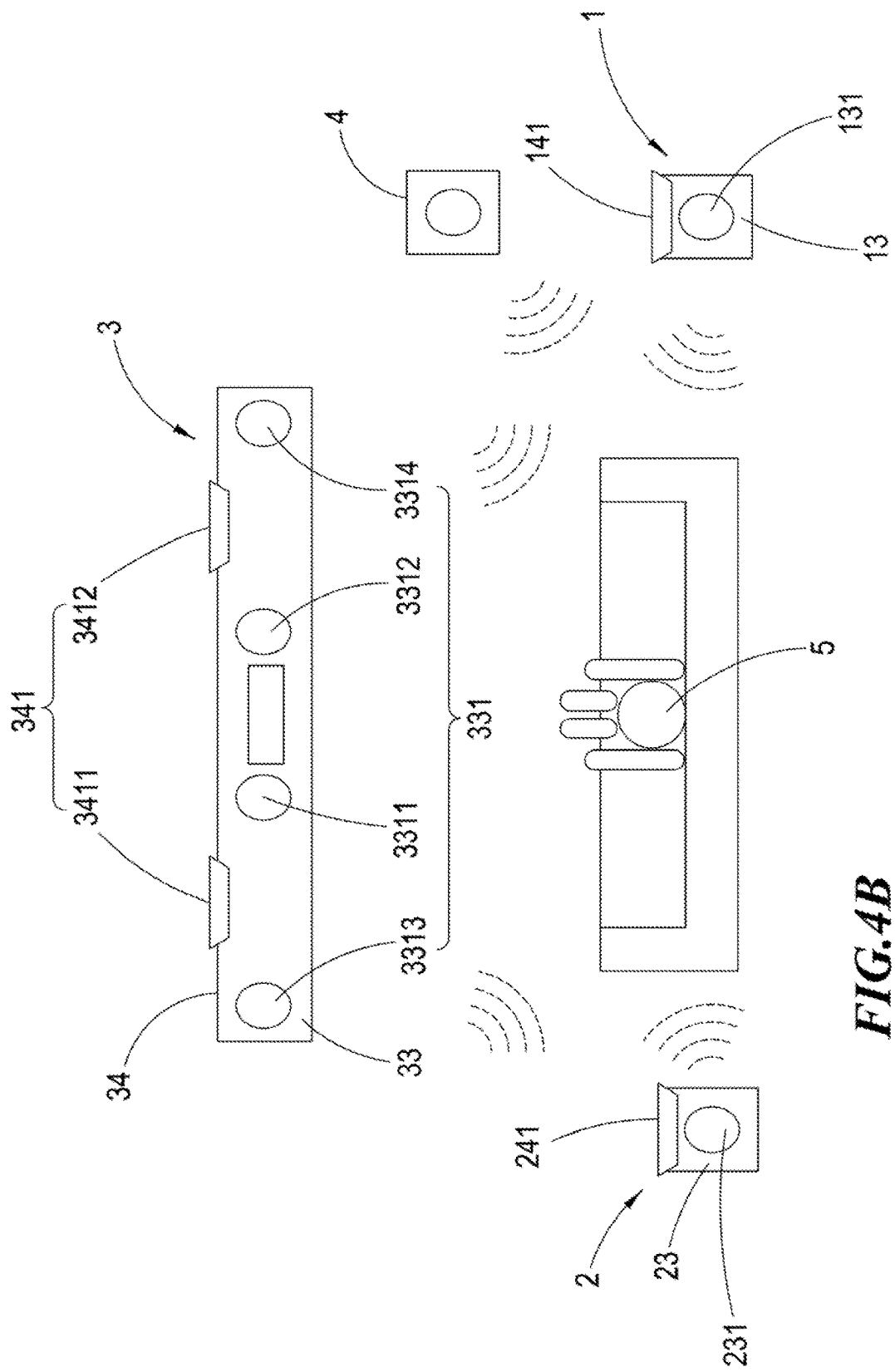
FIG. 4B shows another application diagram for the first embodiment of the surround acoustic box system according to the present invention.

In another application of the first embodiment, as shown in FIG. 4B, the first separable acoustic box 1 and the second separable acoustic box 2 can be respectively detached from the combination baseboards 36 and 37, which may be then respectively placed at the rear right and rear left sides of the user 5 to build a "5.1.4 surround acoustic effect" for the user 5, in which the acoustic effects heard in different directions are provided as below:

(1) the front central acoustic effect is provided by the front speaker units 3311, 3312;

(2) the front right acoustic effect is provided by the front speaker unit 3314;

(3) the rear right acoustic effect is provided by the forward speaker unit 131;

(4) the front left acoustic effect is provided by the front speaker unit 3313;

(5) the rear left acoustic effect is provided by the forward speaker unit 231;

(6) the upper front right acoustic effect is provided by the top speaker unit 3412;

(7) the upper rear right acoustic effect is provided by the upward speaker unit 141;

(8) the upper front left acoustic effect is provided by the top speaker unit 3411;

(9) the upper rear left acoustic effect is provided by the upward speaker unit 241; and

(10) the bass acoustic effect is provided by the bass speaker acoustic box 4.

Figure 5A:
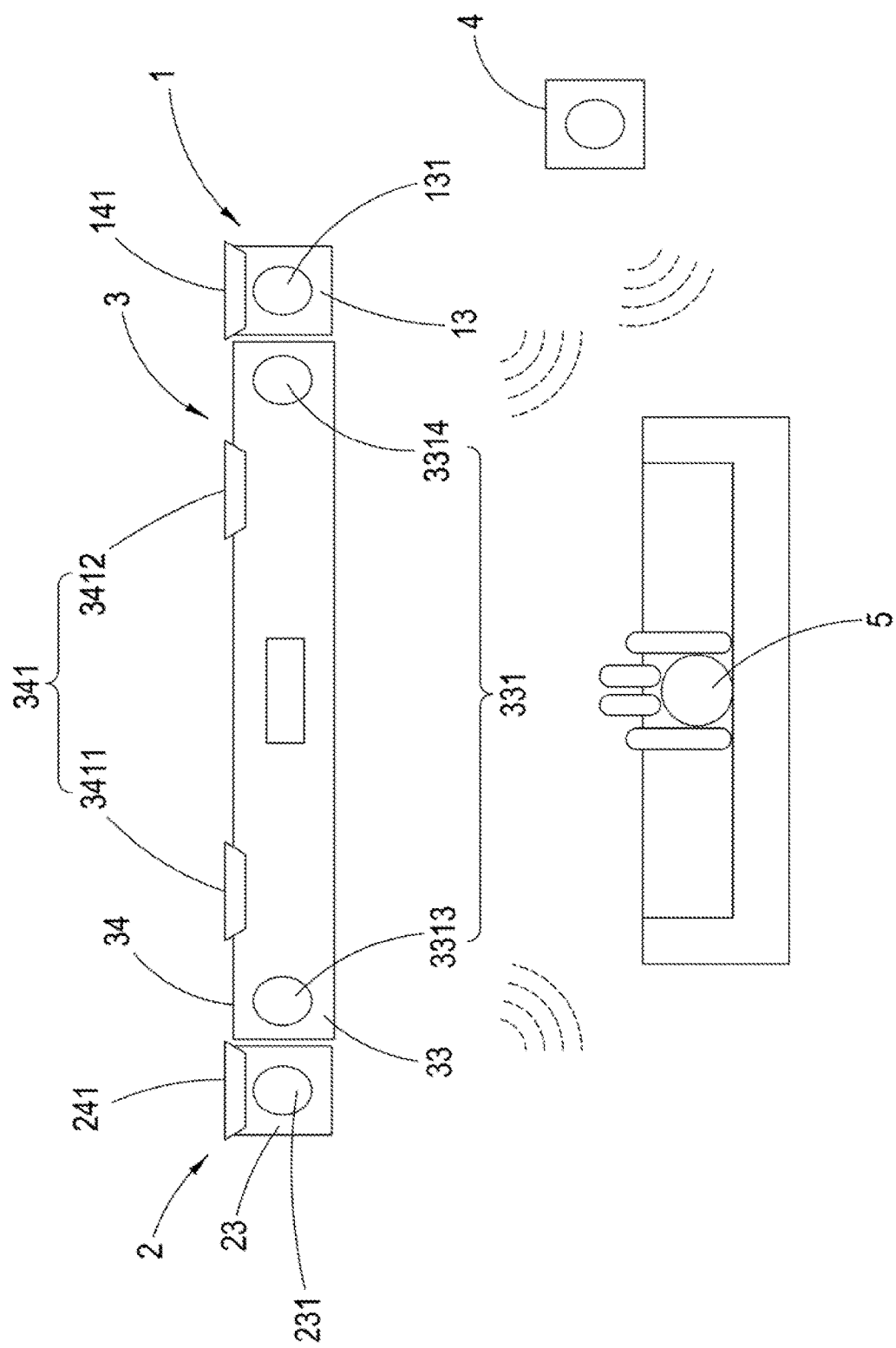
FIG. 5A shows an application diagram for a second embodiment of the surround acoustic box system according to the present invention.

Next, in a second embodiment for the application of the present invention, as shown in FIG. 5A, the first separable acoustic box 1 and the second separable acoustic box 2 are respectively adjoined onto the combination baseboards 36, 37, and the console circuit module 31 controls the first separable acoustic box 1 (including the forward speaker unit 131 and the upward speaker unit 141), the second separable acoustic box 2 (including the forward speaker unit 231 and the upward speaker unit 241), the host acoustic box body 3 (including the front speaker units 3313 and 3314 as well as top speaker units 3411 and 3412) and the bass speaker acoustic box 4 thereby constructing a "3.1.2 surround acoustic effect" for the user 5, in which the acoustic effects heard in different directions are provided as below:

(1) the front central acoustic effect is provided by the front speaker units 3313, 3314;

(2) the front right acoustic effect is provided by the front speaker unit 3314 and the forward speaker unit 131;

(3) the front left acoustic effect is provided by the front speaker unit 3313 and the forward speaker unit 231;

(4) the upper right acoustic effect is provided by the top speaker unit 3412 and the upward speaker unit 141;

(5) the upper left acoustic effect is provided by the top speaker unit 3411 and the upward speaker unit 241; and (6) the bass acoustic effect is provided by the bass speaker acoustic box 4.

Figure 5B:
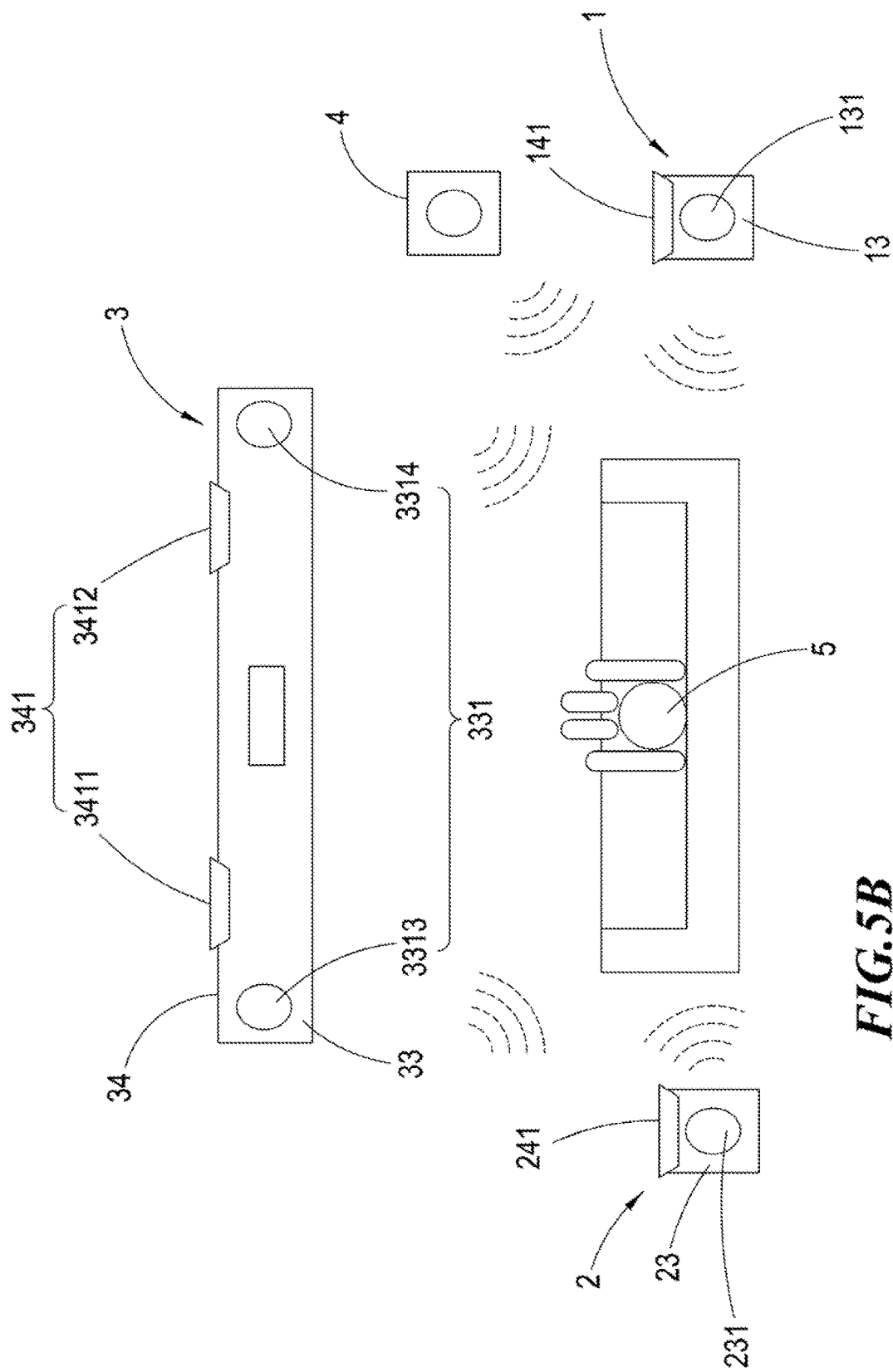
FIG. 5B shows another application diagram for the second embodiment of the surround acoustic box system according to the present invention.

In another application of the second embodiment, as shown in FIG. 5B, the first separable acoustic box 1 and the second separable acoustic box 2 can be respectively detached from the combination baseboards 36 and 37, which may be then respectively placed at the rear right and rear left sides of the user 5 to build a "5.1.4 surround acoustic effect" for the user 5, in which the acoustic effects heard in different directions are provided as below:

(1) the front central acoustic effect is provided by the front speaker units 3313, 3314;

(2) the front right acoustic effect is provided by the front speaker unit 3314;

(3) the rear right acoustic effect is provided by the forward speaker unit 131;

(4) the front left acoustic effect is provided by the front speaker unit 3313;

(5) the rear left acoustic effect is provided by the forward speaker unit 231;

(6) the upper front right acoustic effect is provided by the top speaker unit 3412;

(7) the upper rear right acoustic effect is provided by the upward speaker unit 141;

(8) the upper front left acoustic effect is provided by the top speaker unit 3411;

(9) the upper rear left acoustic effect is provided by the upward speaker unit 241; and

(10) the bass acoustic effect is provided by the bass speaker acoustic box 4.

Figure 6A:
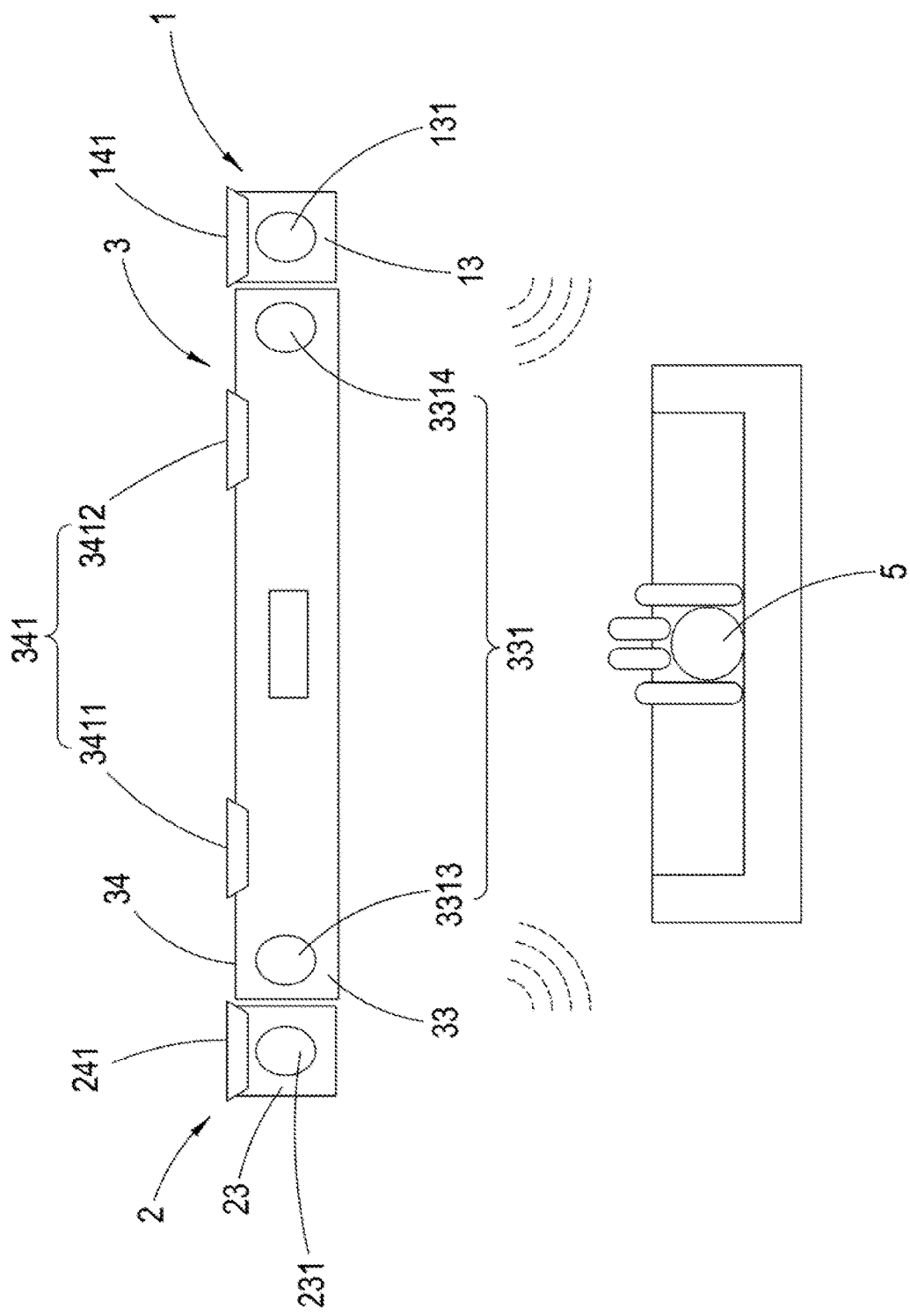
FIG. 6A shows an application diagram for a third embodiment of the surround acoustic box system according to the present invention.

Furthermore, in a third embodiment for the application of the present invention, as shown in FIG. 6A, the first separable acoustic box 1 and the second separable acoustic box 2 are respectively adjoined onto the combination baseboards 36, 37, and the console circuit module 31 controls the first separable acoustic box 1 (including the forward speaker unit 131 and the upward speaker unit 141), the second separable acoustic box 2 (including the forward speaker unit 231 and the upward speaker unit 241), and the host acoustic box body 3 (including the front speaker units 3313 and 3314 as well as top speaker units 3411 and 3412) thereby constructing a "3.0.2 surround acoustic effect" for the user 5 (the bass speaker acoustic box 4 is not included in the present embodiment), in which the acoustic effects heard in different directions are provided as below:

(1) the front central acoustic effect is provided by the front speaker units 3313, 3314;

(2) the front right acoustic effect is provided by the front speaker unit 3314 and the forward speaker unit 131;

(3) the front left acoustic effect is provided by the front speaker unit 3313 and the forward speaker unit 231;

(4) the upper right acoustic effect is provided by the top speaker unit 3412 and the upward speaker unit 141; and (5) the upper left acoustic effect is provided by the top speaker unit 3411 and the upward speaker unit 241.

Figure 6B:
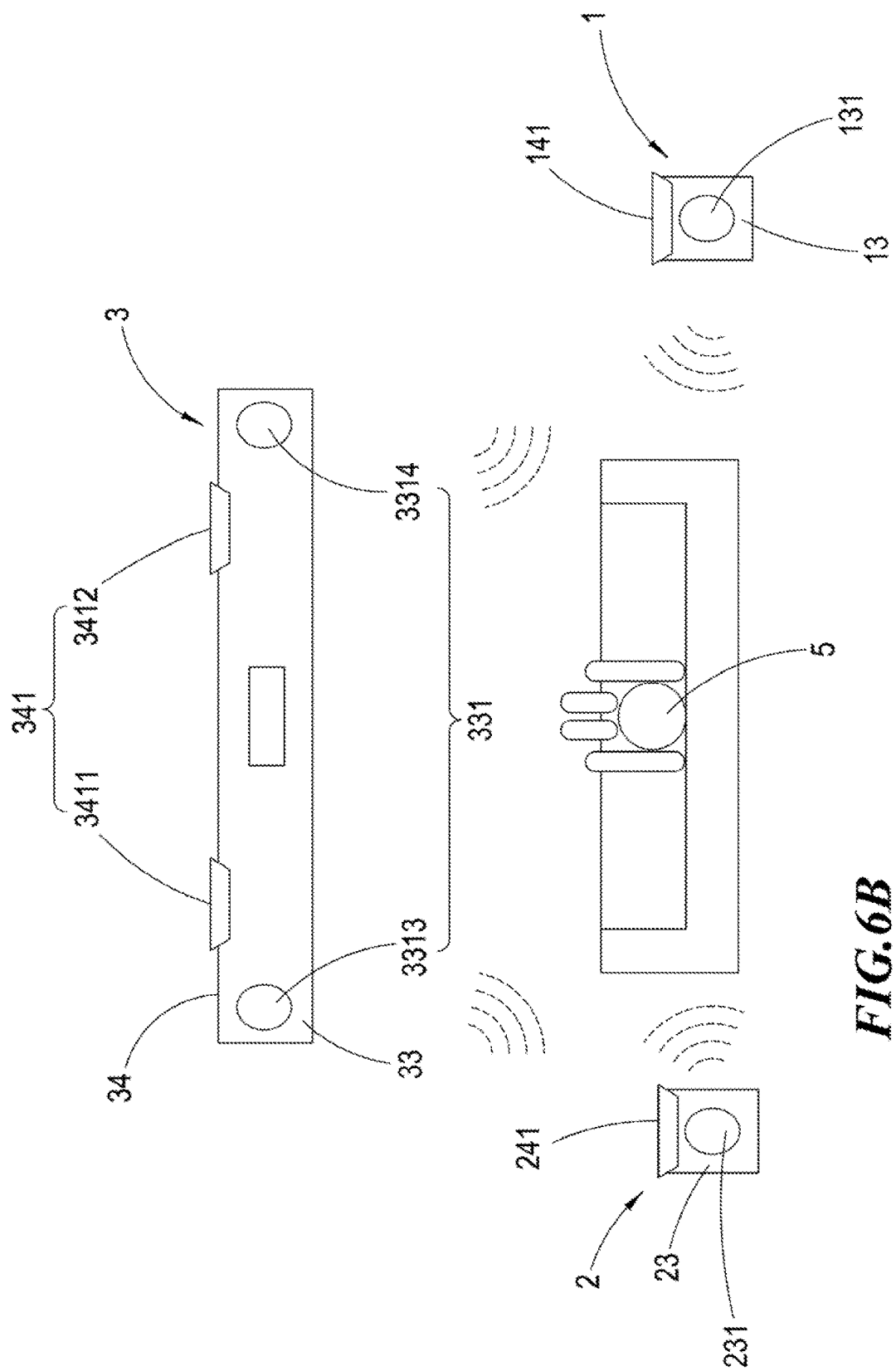
FIG. 6B shows another application diagram for the third embodiment of the surround acoustic box system according to the present invention.

In another application of the third embodiment, as shown in FIG. 6B, the first separable acoustic box 1 and the second separable acoustic box 2 can be respectively detached from the combination baseboards 36 and 37, which may be then respectively placed at the rear right and rear left sides of the user 5 to form a "5.0.4 surround acoustic effect" (the bass speaker acoustic box 4 is not included in the present embodiment), in which the acoustic effects heard in different directions are provided as below:

(1) the front central acoustic effect is provided by the front speaker units 3313, 3314;

(2) the front right acoustic effect is provided by the front speaker unit 3314;

(3) the rear right acoustic effect is provided by the forward speaker unit 131;

(4) the front left acoustic effect is provided by the front speaker unit 3313;

(5) the rear left acoustic effect is provided by the forward speaker unit 231;

(6) the upper front right acoustic effect is provided by the top speaker unit 3412;

(7) the upper rear right acoustic effect is provided by the upward speaker unit 141;

(8) the upper front left acoustic effect is provided by the top speaker unit 3411; and (9) the upper rear left acoustic effect is provided by the upward speaker unit 241.

Figure 7A:
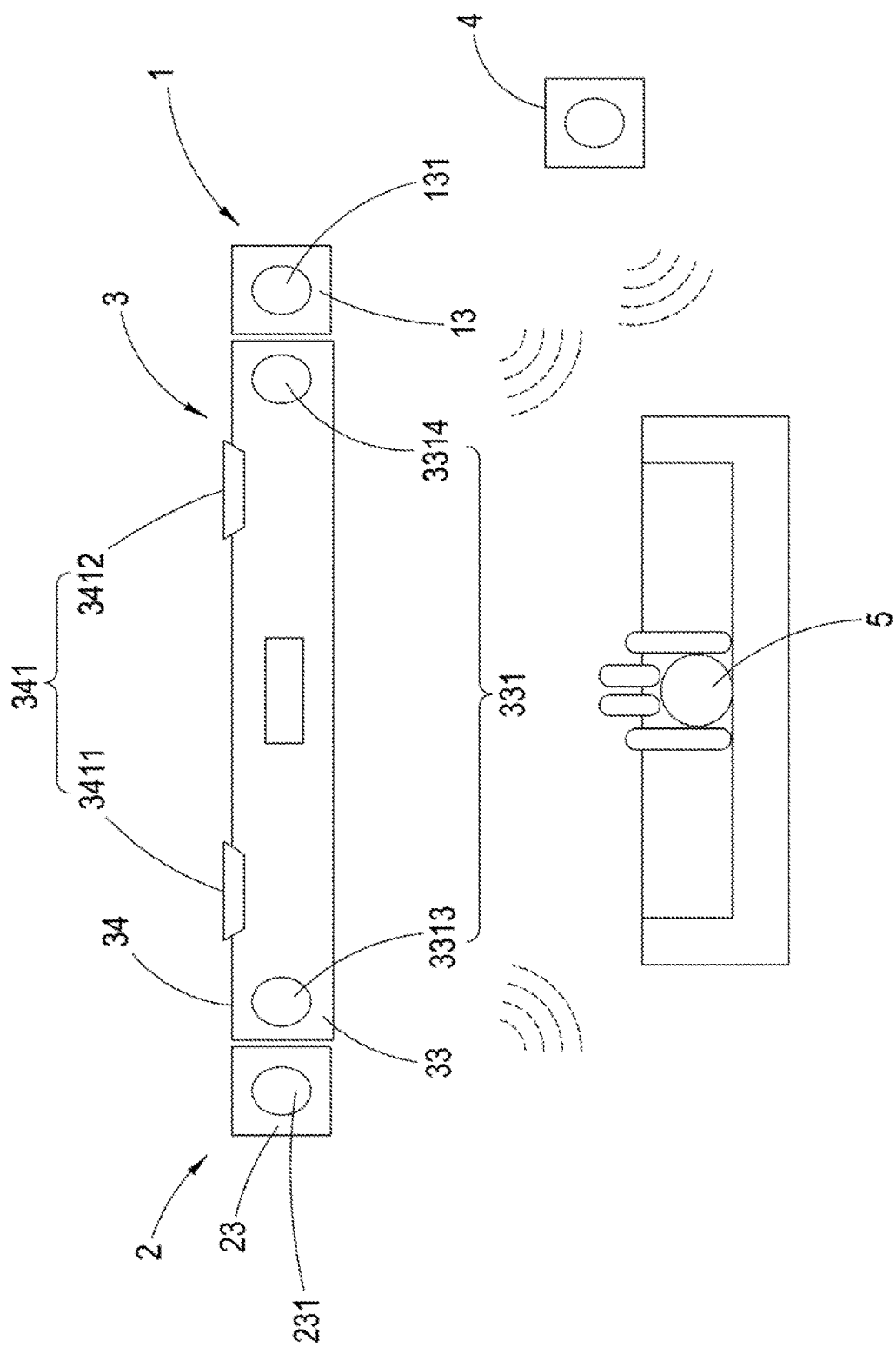
FIG. 7A shows an application diagram for a fourth embodiment of the surround acoustic box system according to the present invention.

Additionally, in a fourth embodiment for the application of the present invention, as shown in FIG. 7A, the first separable acoustic box 1 and the second separable acoustic box 2 are respectively adjoined onto the combination baseboards 36, 37, and the console circuit module 31 controls the first separable acoustic box 1 (including the forward speaker unit 131), the second separable acoustic box 2 (including the forward speaker unit 231), the host acoustic box body 3 (including the front speaker units 3313 and 3314 as well as top speaker units 3411 and 3412) and the bass speaker acoustic box 4 thereby constructing a "3.1.2 surround acoustic effect" for the user 5, in which the acoustic effects heard in different directions are provided as below:

(1) the front central acoustic effect is provided by the front speaker units 3313, 3314;

(2) the front right acoustic effect is provided by the front speaker unit 3314 and the forward speaker unit 131;

(3) the front left acoustic effect is provided by the front speaker unit 3313 and the forward speaker unit 231;

(4) the upper right acoustic effect is provided by the top speaker unit 3412;

(5) the upper left acoustic effect is provided by the top speaker unit 3411; and (6) the bass acoustic effect is provided by the bass speaker acoustic box 4.

Figure 7B:
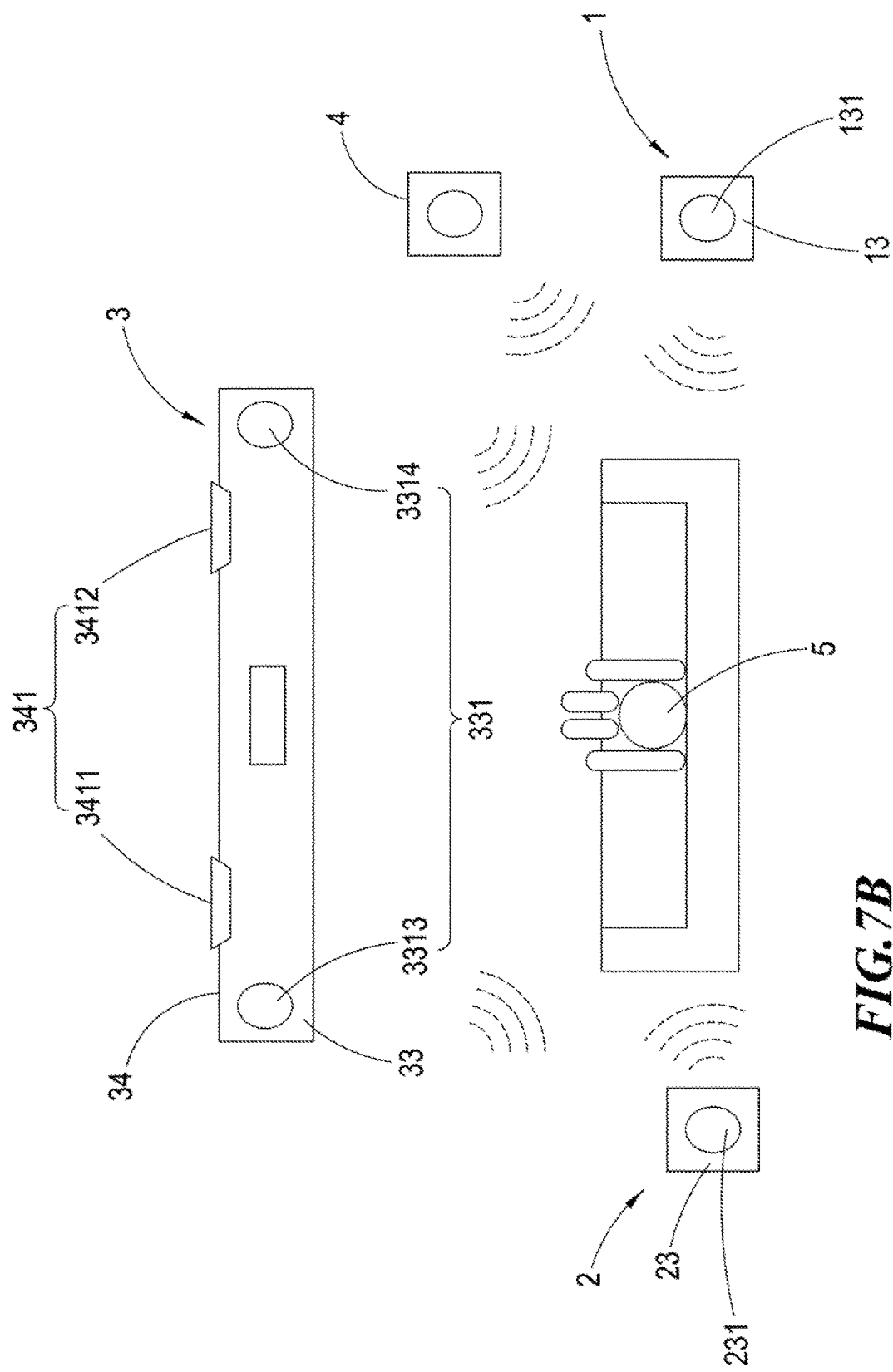
FIG. 7B shows another application diagram for the fourth embodiment of the surround acoustic box system according to the present invention.

In another application of the fourth embodiment, as shown in FIG. 7B, the first separable acoustic box 1 and the second separable acoustic box 2 can be respectively detached from the combination baseboards 36 and 37, which may be then respectively placed at the rear right and rear left sides of the user 5 to build a "5.1.2 surround acoustic effect", in which the acoustic effects heard in different directions are provided as below:

(1) the front central acoustic effect is provided by the front speaker units 3313, 3314;

(2) the front right acoustic effect is provided by the front speaker unit 3314;

(3) the rear right acoustic effect is provided by the forward speaker unit 131;

(4) the front left acoustic effect is provided by the front speaker unit 3313;

(5) the rear left acoustic effect is provided by the forward speaker unit 231;

(6) the upper front right acoustic effect is provided by the top speaker unit 3412;

(7) the upper front left acoustic effect is provided by the top speaker unit 3411; and (8) the bass acoustic effect is provided by the bass speaker acoustic box 4.

Figure 8A:
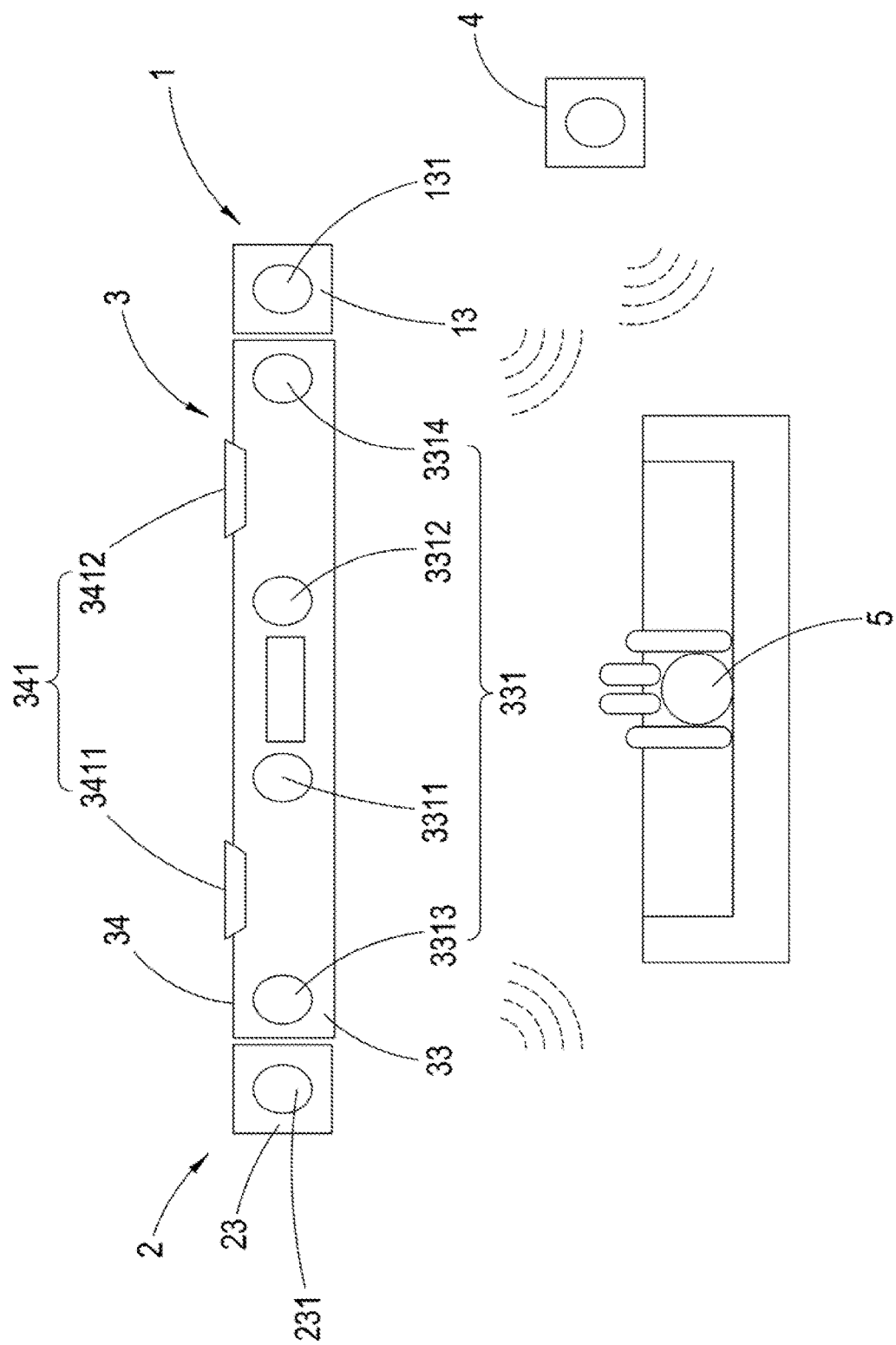
FIG. 8A shows an application diagram for a fifth embodiment of the surround acoustic box system according to the present invention.

Also, in a fifth embodiment for the application of the present invention, as shown in FIG. 8A, the first separable acoustic box 1 and the second separable acoustic box 2 are respectively adjoined onto the combination baseboards 36, 37, and the console circuit module 31 controls the first separable acoustic box 1 (including the forward speaker unit 131), the second separable acoustic box 2 (including the forward speaker unit 231), the host acoustic box body 3 (including the front speaker units 3311, 3312, 3313 and 3314 as well as top speaker units 3411 and 3412) and the bass speaker acoustic box 4 thereby constructing a "3.1.2 surround acoustic effect" for the user 5, in which the acoustic effects heard in different directions are provided as below:

(1) the front central acoustic effect is provided by the front speaker units 3311, 3312;

(2) the front right acoustic effect is provided by the front speaker unit 3314 and the forward speaker unit 131;

(3) the front left acoustic effect is provided by the front speaker unit 3313 and the forward speaker unit 231;

(4) the upper right acoustic effect is provided by the top speaker unit 3412;

(5) the upper left acoustic effect is provided by the top speaker unit 3411; and (6) the bass acoustic effect is provided by the bass speaker acoustic box 4.

Figure 8B:
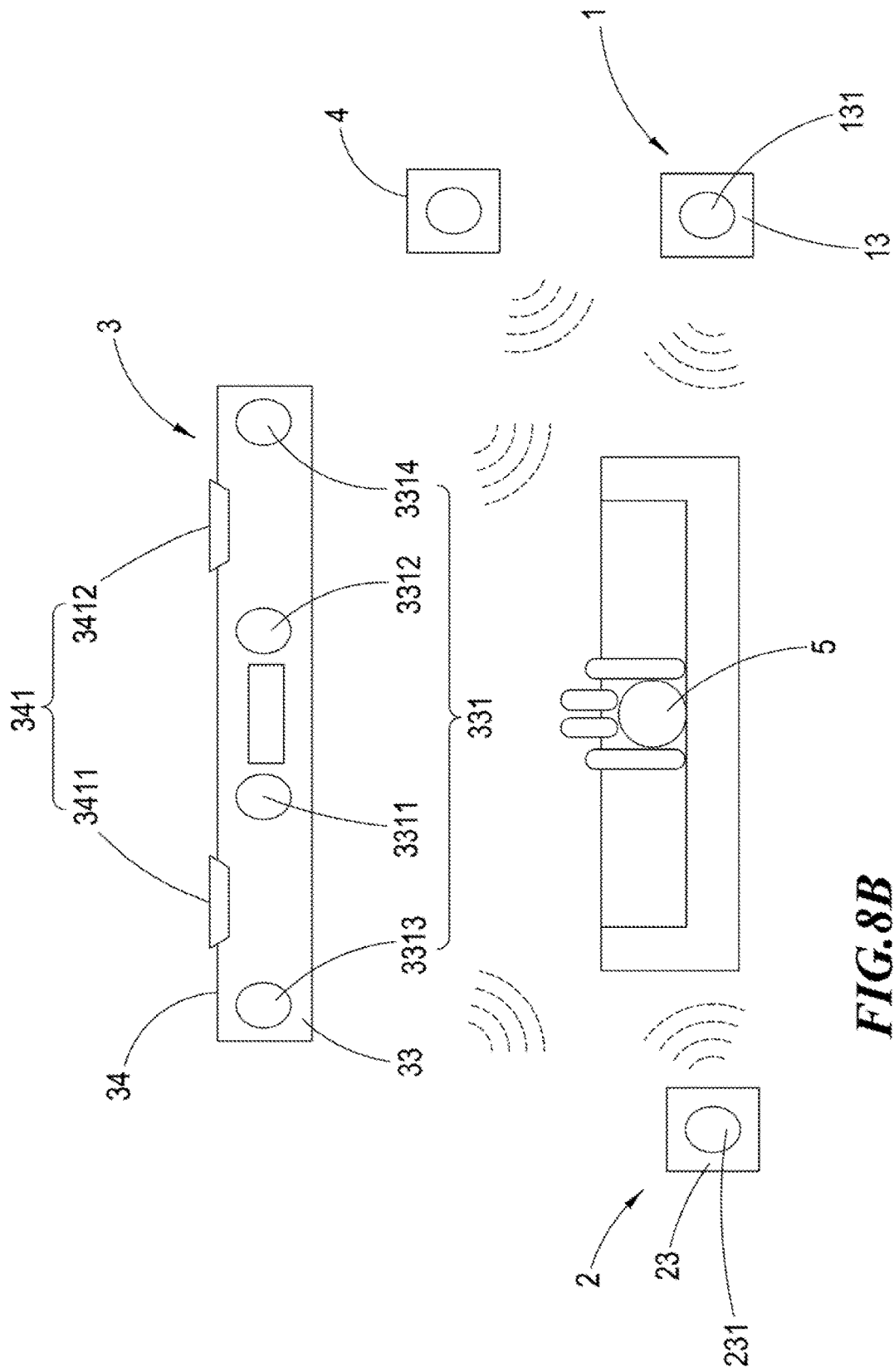
FIG. 8B shows another application diagram for the fifth embodiment of the surround acoustic box system according to the present invention.

In another application of the first embodiment, as shown in FIG. 8B, the first separable acoustic box 1 and the second separable acoustic box 2 can be respectively detached from the combination baseboards 36 and 37, which may be then respectively placed at the rear right and rear left sides of the user 5 to build a "5.1.2 surround acoustic effect", in which the acoustic effects heard in different directions are provided as below:

(1) the front central acoustic effect is provided by the front speaker units 3311, 3312;

(2) the front right acoustic effect is provided by the front speaker unit 3314;

(3) the rear right acoustic effect is provided by the forward speaker unit 131;

(4) the front left acoustic effect is provided by the front speaker unit 3313;

(5) the rear left acoustic effect is provided by the forward speaker unit 231;

(6) the upper front right acoustic effect is provided by the top speaker unit 3412;

(7) the upper front left acoustic effect is provided by the top speaker unit 3411; and (8) the bass acoustic effect is provided by the bass speaker acoustic box 4.

In addition, the surround acoustic box system according to the present invention also enables the function of mobile power source, so that, upon using the surround acoustic box system to charge other devices, as shown in FIG. 3, it needs to electrically connect the power source connection line 8 to an external device 9 at the power supply terminal 14 so as to charge the external device 9 via the charging device 2.

In comparison with other conventional technologies, the surround acoustic box system according to the present invention provides the following advantages:

1. The present invention allows to use at least two separable acoustic boxes and a host acoustic box body and such separable acoustic boxes can be attached or detached from the host acoustic box body thereby applying various controls via the host acoustic box body so as to achieve different surround channel effects.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A surround acoustic box, comprising:

at least a first separable acoustic box, including at least a first positioning connection part, a first charging connection part and a wireless transmission circuit module, wherein it is possible to input electric power for the operations of the first separable acoustic box by way of the first charging connection part, and the first separable acoustic box comprises at least a forward speaker unit for providing a forward channel, and the forward speaker unit is installed on a forward surface of the first separable acoustic box;

at least a second separable acoustic box, including at least a second positioning connection part, a second charging connection part and a wireless transmission circuit module, wherein it is possible to input electric power for the operations of the second separable acoustic box by way of the second charging connection part, and the second separable acoustic box comprises at least a forward speaker unit for providing the forward channel, and the forward speaker unit is installed on the forward surface of the second separable acoustic box; and a host acoustic box body, being a horizontal bar-like acoustic box and comprising:

a console circuit module, for controlling the operations of the host acoustic box body, in which the console circuit module can perform wireless signal transmissions with the first separable acoustic box and the second separable acoustic box;

a power supply circuit module, electrically connected to the console circuit module thereby providing electric power the host acoustic box body require for operations;

at least a first positioning sensor part, electrically connected to the console circuit module and the power supply circuit module, in which the first positioning connection part of the first separable acoustic box is connected to the first positioning sensor part thereby allowing mutual signal transmissions between the console circuit module and the first separable acoustic box;

at least a second positioning sensor part, electrically connected to the console circuit module and the power supply circuit module, in which the second positioning connection part of the second separable acoustic box is connected to the second positioning sensor part thereby allowing mutual signal transmissions between the console circuit module and the second separable acoustic box;

a front speaker set, installed on the forward surface of the host acoustic box body, in which the front speakers are electrically connected to the console circuit module and the power supply circuit module thereby outputting to provide the right channel effect, left channel effect and central straight channel effect; and a top speaker set, obliquely installed on the upward surface of the host acoustic box body, in which the top speakers are electrically connected to the console circuit module and the power supply circuit module thereby outputting to provide the upper right channel effect and upper left channel effect; and wherein the first separable acoustic box and the second separable acoustic box can be attached to the host acoustic box body or detached therefrom so as to achieve various surround channel effects through the controls of the console circuit module, wherein the first separable acoustic box further includes a cross-shaped first positioning frame bar capable of at least encompassing the first positioning connection part, and the host acoustic box body further includes a cross-shaped first positioning frame hole corresponding to the cross-shaped first positioning frame bar, and the cross-shaped first positioning frame hole at least encompass the first positioning sensor part, in which the cross-shaped first positioning frame bar is inserted into the cross-shaped first positioning frame hole such that the first positioning connection part precisely aligns with the first positioning sensor part, and wherein the cross-shaped first positioning frame bar engages the cross-shaped first positioning frame hole and tilts away from the host acoustic box body, so that the cross-shaped first positioning frame bar is only able to be installed to the host acoustic box body in a specific side to achieve a fool-proof effect.

2. The surround acoustic box system according to claim 1, wherein the first charging connection part can be a contact endpoint, and the host acoustic box body further includes a first power supply output part electrically connected to the console circuit module and the power supply circuit module, in which the first charging connection part can be electrically connected to the first power supply output part such that the first power supply output part can output electric power to the first charging connection part of the first separable acoustic box.

3. The surround acoustic box system according to claim 1, wherein the first charging connection part is a USB port, and a power line having a USB plug can be connected thereto.

4. The surround acoustic box system according to claim 1, wherein the second charging connection part can be a contact endpoint, and the host acoustic box body further includes a second power supply output part electrically connected to the console circuit module and the power supply circuit module, in which the second charging connection part can be electrically connected to the second power supply output part such that the second power supply output part can output electric power to the second charging connection part of the second separable acoustic box.

5. The surround acoustic box system according to claim 1, wherein the second charging connection part is a USB port, and a power line having a USB plug can be connected thereto.

6. The surround acoustic box system according to claim 1, wherein the first separable acoustic box further includes at least an upward speaker unit for providing upward channels, and the upward speaker unit is obliquely installed on the upward surface of the first separable acoustic box.

7. The surround acoustic box system according to claim 1, wherein the second separable acoustic box further includes at least an upward speaker unit for providing upward channels, and the upward speaker unit is obliquely installed on the upward surface of the second separable acoustic box.

8. The surround acoustic box system according to claim 1, further comprising a bass speaker acoustic box enabling wireless signal transmissions with the console circuit module thereby providing bass effect outputs.

9. The surround acoustic box system according to claim 1, wherein the console circuit module can control any one or more of the first separable acoustic box, the second separable acoustic box and the console acoustic box body to output bass effects.

10. The surround acoustic box system according to claim 1, wherein the first separable acoustic box further includes a first frame and the host acoustic box body further includes a first groove corresponding to the first frame, in which, after inserting the first frame into the first groove, the first positioning connection part can be precisely connected to the first positioning sensor part.

11. The surround acoustic box system according to claim 1, wherein the second separable acoustic box further includes a second positioning frame bar capable of at least encompassing the second positioning connection part, and the host acoustic box body further includes a second positioning frame hole corresponding to the second positioning frame bar, and the second positioning frame hole can at least encompass the second positioning sensor part, in which the second positioning frame bar can be inserted into the second positioning frame hole such that the second positioning connection part precisely aligns with the second positioning sensor part.

12. The surround acoustic box system according to claim 1, wherein the second separable acoustic box further includes a second frame and the host acoustic box body further includes a second groove corresponding to the second frame, in which, after inserting the second frame into the second groove, the second positioning connection part can be precisely connected to the second positioning sensor part.

13. The surround acoustic box system according to claim 1, wherein the inside of the first separable acoustic box further includes a first chargeable battery electrically connected to the first charging connection part.

14. The surround acoustic box system according to claim 1, wherein the inside of the second separable acoustic box further includes a second chargeable battery electrically connected to the second charging connection part.

* * * * *